United States Patent [19]
Nobusawa

[11] 3,741,088
[45] June 26, 1973

[54] PHOTOSENSITIVE SYSTEM FOR RESPONDING TO DIFFERENT LUMINOSITIES OF AN OBJECT

[75] Inventor: Tsukumo Nobusawa, Tokyo, Japan

[73] Assignee: Asahi Kogaku Kogyo Kabushiki Kaisha, Tokyo-to, Japan

[22] Filed: Sept. 23, 1971

[21] Appl. No.: 183,040

[30] Foreign Application Priority Data
Oct. 2, 1970  Japan.............................. 45/85914

[52] U.S. Cl. ............ 95/10 CT, 95/10 CE, 356/222
[51] Int. Cl. ............................................. G03b 7/08
[58] Field of Search ..................... 95/10 CE, 10 CT, 95/10 CD, 10 PO; 356/222

[56] References Cited
UNITED STATES PATENTS
3,310,679  3/1967  Babish ............................. 95/10 X
3,545,350  12/1970  Gross ..................................... 95/10

Primary Examiner—Samuel S. Matthews
Assistant Examiner—Michael L. Geliner
Attorney—Steinberg & Blake

[57] ABSTRACT

A photosensitive system to be used in connection with photography for responding to regions of different luminosity of an object which is to be photographed. The system includes a detector circuit for detecting the regions of an object where the latter has maximum and minimum luminosity and for providing a signal corresponding to the average luminosity at an object. A control circuit is electrically connected with the detector circuit for receiving the latter signal therefrom, and an electrically-responsive structure is electrically connected with and actuated by the control circuit to produce, in connection with photographing the object, an operation according to an input received from the control circuit and determined by the signal corresponding to the average luminosity.

9 Claims, 2 Drawing Figures

INVENTOR
TSUKUMO NOBUSAWA
BY
Steinberg and Blake
ATTORNEYS

1

PHOTOSENSITIVE SYSTEM FOR RESPONDING TO DIFFERENT LUMINOSITIES OF AN OBJECT

BACKGROUND OF THE INVENTION

The present invention relates to devices used in connection with photography, and in particular to devices whose operation is determined in accordance with the luminosity at an object which is to be photographed.

When making photographs of any object, it is very seldom that one encounters an object which has an even, uniform luminosity throughout all regions of the object which is to be photographed. Most objects have different luminosities at different regions. For example when photographing sky and land on a bright day, the range of luminosity will have a very wide variation at different regions of the object, with certain areas of the sky being extremely bright while areas of the land are quite dark. Under these conditions the large range of luminosity over the entire object creates problems since there is a known range of acceptable exposure which is peculiar to the particular film which is used, depending upon the latitude thereof. Thus, the lack of uniform luminosity of the object and the particular film latitude must both be taken into consideration in order to determine the best possible conditions for exposing the film. When photographing objects of particularly non-uniform distribution of illumination, it has been customary to determine exposure by means of average illumination photometry or spot photometry.

These latter measures, however, have been accompanied by many technical problems. For example it is particularly disadvantageous that with conventional average illumination photometry there is likely to be an exposure determined not by the average but rather by that part of the object where a given light intensity occupies the largest area in the distribution of luminosity, whereas in the case of spot photometry, a measurement of a selected region of the object is made with the requirement of extremely inconvenient photographic operations involving complex calculations.

SUMMARY OF THE INVENTION

It is accordingly a primary object of the present invention to provide a system which will avoid the above drawbacks.

In particular, it is an object of the present invention to provide a photosensitive system for detecting luminosity at an object and for providing signals corresponding to maximum and minimum luminosity with the latter signals being used to achieve an average luminosity value to enable accurate photographic exposures to be made.

A further object of the present invention is to provide an electrical system of the above type which is simple and compact, being composed of elements such as transistors, diodes and capacitors, as well as one or more photoconductors, so that the entire system will be compact and simple to construct while at the same time achieving highly accurate results.

A further object of the present invention is to provide an electrical system of the above type which requires only one photoconductor for responding to the regions of maximum and minimum luminosity.

Also it is an object of the present invention to provide an electrical system of the above type which has a plurality of photoconductors which will automatically coact with the remainder of the detecting system to provide signals corresponding to maximum and minimum luminosity.

It is also an object of the present invention to provide a system of the above type which will accurately achieve a signal corresponding to the average between regions of maximum and minimum luminosity of an object.

According to the invention the system to be used in connection with the photographing of an object which has regions of different luminosities includes a detector circuit for detecting the regions of maximum and minimum luminosity and for providing a pair of signals respectively corresponding to the maximum and minimum luminosity. An electrically-responsive means is provided to respond electrically to a given input so as to bring about an operation to be used in connection with the photographing of an object. A control circuit means is electrically connected between the detector circuit means and the electrically-responsive means for receiving the signals from the detector circuit means and for providing in accordance with the latter signals input to the electrically-responsive means so that the latter will respond to the latter input for achieving the operation required in connection with the photographing of the object.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
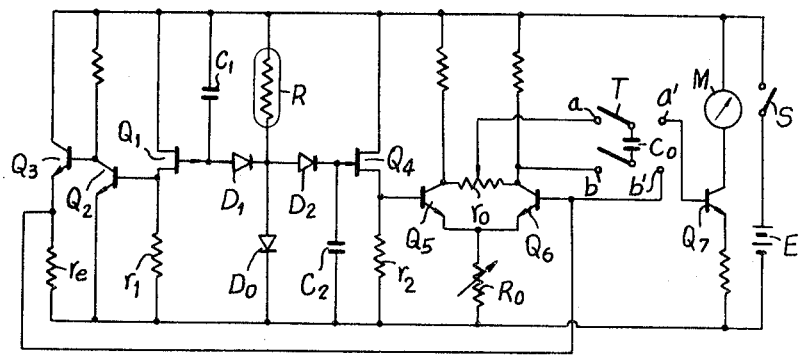
FIG. 1 is a wiring diagram of one embodiment of a system according to the present invention.

Referring first to FIG. 1, the system of the invention which is illustrated therein includes a photoconductor R forming part of a detector circuit means for detecting regions of different luminosity of an object which is to be photographed. The photoconductor R will in a well known manner provide a resistance value which will be determined by the brightness of the light which reaches the photoconductor. The detector circuit means includes in addition to the photoconductor R a diode $D_0$ which is connected in series with the photoconductor for logarithmic conversion, the series-connected components R and $D_0$ being electrically connected through a switch S with a source of energy formed by the battery E. A pair of additional diodes $D_1$ and $D_2$ are electrically connected to a junction between the photoconductor R and the diode $D_0$, and the diode $D_1$ is connected in series with a capacitor $C_1$ which is in parallel with the photoconductor R while the diode $D_2$ is connected in series with a capacitor $C_2$ which is in parallel with the diode $D_0$. Thus, a signal corresponding to the luminosity of lowest value will be stored as a charge at the capacitor $C_1$ while a signal corresponding to the luminosity of highest value will be stored as a charge at the capacitor $C_2$. In this way this structure forms a detector circuit means for detecting luminosity regions of maximum value when the photoconductor R is directed toward an object region of maximum luminosity and minimum value when directed toward a region of minimum luminosity. A field effect transistor $Q_1$ of high input impedance is electrically connected with the capacitor $C_1$ so as to be controlled thereby in accordance with the signal corresponding to the region of minimum luminosity. In accordance with the signal storage achieved by the capacitor $C_1$ and the field effect transistor $Q_1$, the latter operates, approaching its state of continuity, as the potential of resistor $r_1$ connected to the transistor $Q_1$ rises, and the phase of the signal at the transistor $Q_1$ is inverted by transistor $Q_2$ which is the stage of the detector circuit mean following the field effect transistor $Q_1$. The transistor $Q_2$ is connected to an additional transistor $Q_3$ which has its base electrode connected to the collector of the transistor $Q_2$ for phase inversion, and the emitter of transistor $Q_3$ is electrically connected with the load resistor $r_e$. Therefore, the current flowing through the load resistance $r_e$ is reduced in accordance with the operation of transistor $Q_2$ as the latter approaches its state of continuity. A second field effect transistor $Q_4$ of N channels acts as a transistor of high input impedance with its storage operation controlled with the signal corresponding to the maximum luminosity stored by the capacitor $C_2$, and a load resistor $r_2$ is connected to the transistor $Q_4$. The above-described detector circuit means is electrically connected with a control circuit means which includes a comparison circuit formed by a transistor $Q_5$ and a transistor $Q_6$. The transistor $Q_5$ of the comparison circuit has its base electrically connected to a junction between the field effect transistor $Q_4$ and the resistor $r_2$. The other transistor $Q_6$ of the comparison circuit has its base electrically connected to a junction between the transistor $Q_3$ and the load resistor $r_e$. These transistors $Q_5$ and $Q_6$ of the comparison circuit of the control circuit means have their emitters electrically connected to each other to form a common emitter electrode to which a variable resistor $R_o$ is electrically connected, while a common resistor $r_o$ is electrically connected between the collector electrodes of the transistors $Q_5$ and $Q_6$. Thus, the comparison circuit formed by the transistors $Q_5$ and $Q_6$ of the control circuit means will compare the signals from the detector circuit means which correspond to the regions of the maximum and minimum luminosity of the object which is to be photographed. With the comparison circuit the difference between the voltage signals corresponding to maximum and minimum luminosity will appear at the resistor $r_o$ connected between the transistors $Q_5$ and $Q_6$.

The control circuit means includes in addition to the comparison circuit a change-over switch means T having four contacts for two circuits with the contact $a$ connected to a central point of the resistor $r_o$ while the contact $b$ is connected to the collector electrode of transistor $Q_6$. The contact $b'$ is electrically connected to the base electrode of the transistor $Q_6$, and the fourth contact $a'$ is electrically connected to the base of a transistor $Q_7$. A capacitor $C_o$ is connected between the movable blades of the switch means T for temporarily being charged with the difference between the voltage signals corresponding to maximum and minimum luminosity when the switch means T has its blades electrically connected with the switch contacts $a$ and $b$.

The transistor $Q_7$ forms part of an electrically-responsive means for receiving from the control circuit means an input to which the electrically-responsive means will respond for providing an operation to be used in connection with the photographing of an object. In the illustrated example the transistor $Q_7$ is electrically connected with a meter M such as an ammeter.

When using the system of the invention described above and illustrated in FIG. 1, the entire area of the object which is to be photographed is scanned by the photoconductor R simply by directing the latter over the entire area of the object to be photographed so as to respond to the regions of different luminosity. This operation takes place after the switch S is closed. When the photoconductor R detects the region of minimum luminosity, the largest potential drop occurs since the resistance of the photoconductor R is then at its maximum value, as is well known. As a result the capacitor $C_1$ is charged with a potential which is stored as a signal corresponding to the minimum luminosity region of the object which is to be photographed.

On the other hand, as the photoconductor R detects regions of higher luminosity, the resistance of the photoconductor R drops with the signal corresponding to minimum luminosity stored and held in the capacitor $C_1$ in a stable manner by the diode $D_1$ and the field effect transistor $Q_1$ which acts as a transistor of high input impedance. Upon detecting the region of maximum luminosity, the internal resistance of the photoconductor R reaches its minimum value and as a consequence the current flowing through the diode $D_o$, which serves as an element for logarithmic conversion, is at a maximum value because of the minimum internal resistance of the photoconductor R. Thus, the capacitor $C_2$ which is connected in parallel with the diode $D_o$ is charged with the maximum voltage drop of the diode $D_o$, and this charge corresponding to maximum luminosity is stored as the final information signal by the capacitor $C_2$. The charge at the latter capacitor is maintained stable, in the same way as the charge at the capacitor $C_1$, by the diode $D_2$ and the field effect transistor $Q_4$.

The signal corresponding to the region of lowest luminosity stored at the capacitor $C_1$, as a result of the storage operation of the field effect transistor $Q_1$, establishes a transmission or continuity of the signal through the field effect transistor $Q_1$ to bring about through the transistor $Q_2$ an inversion of the phase with a rise in potential at the load resistor $r_1$ electrically connected between the transistors $Q_1$ and $Q_2$ so that the operation of these transistors corresponds to the signal storage operation by the field effect transistor $Q_1$. The voltage developed at the load resistor $r_e$ assumes a relatively low value since the base of the transistor $Q_3$ is electrically connected with the collector of the transistor $Q_2$.

At the same time, the capacitor $C_2$ which has stored a signal corresponding to the maximum luminosity acts through the storage operation of the field effect transistor $Q_4$ to achieve a relatively high voltage at the load resistor $r_2$ connected to the field effect transistor $Q_4$ in the same way that the load resistor $r_1$ is connected to the field effect transistor $Q_1$. As a result the transistors $Q_5$ and $Q_6$ of the comparison circuit are operated by these maximum and minimum voltage signals at the load resistors $r_2$ and $r_e$, respectively, these voltages acting as bias voltages for the transistors $Q_5$ and $Q_6$, respectively. Therefore, there will develop at the resistor $r_o$ a potential corresponding to the difference between the maximum and minimum luminosities at the object which is to be photographed.

The contact $a$ of the switch means T is electrically connected to the resistor $r_o$ so as to tap the latter centrally, with the result that one-half difference between the signals corresponding to maximum and minimum luminosity is stored at the capacitor $C_o$ when the switch means T is electrically connected with the contacts $a$ and $b$. Thus, the centrally tapped resistor $r_o$ forms a means for charging the capacitor $C_o$ according to one-half the difference between the signals corresponding to maximum and minimum luminosity.

The switch means T of the control circuit means which includes the comparison circuit formed by the transistors $Q_5$ and $Q_6$ as well as the capacitor $C_o$ is then switched over to engage the contacts $a'$ and $b'$, with the result that the charge at the capacitor $C_o$ corresponding to one-half the difference between the maximum and minimum luminosities is added to the minimum luminosity signal corresponding to the voltage developed at the load resistor $r_e$ of the transistor $Q_3$, and thus the addition of one-half the difference between the signals to the minimum signal will correspond to the arithmetic average between the maximum and minimum luminosity signals. Thus, the part of the circuit which is connected to the contact $b'$ of the switch means forms a means for adding to the signal according to one-half the difference between the maximum and minimum luminosity the signal according to the minimum luminosity. The electrically-responsive means formed by the transistor $Q_7$ and the ammeter M will thus respond to provide at the meter M a reading corresponding to the average between the maximum and minimum light intensities, when the switch means T is switched over to engage the contacts $a'$ and $b'$, so that this average value indicated by the meter M may be directly read at the meter to provide information to be used in connection with the extent to which film in a camera is to be exposed.

The above-described circuit of FIG. 1 can be changed by having the contacts $b$ and $b'$ of the switch means T respectively connected to the collector electrode and base electrode of the transistor $Q_5$, since in this case the meter M will give an average reading corresponding to subtraction of one-half the difference between the signals from the maximum luminosity signal, and this arithmetic operation will also result in an arithmetic average.

It is also possible to vary the system of FIG. 1 by substituting for the resistor $r_o$ an indicating instrument such as an ammeter for directly measuring the difference between the maximum and minimum luminosity signals. Also it is possible to connect a pair of indicating instruments such as ammeters respectively into the collector circuits of the transistors $Q_5$ and $Q_6$ without using the resistor $r_o$, so as to provide direct measurement of the maximum and minimum luminosity signals, and then these values can be averaged for determining in a highly accurate manner the extent to which film in a camera is exposed, for example.

Figure 2:
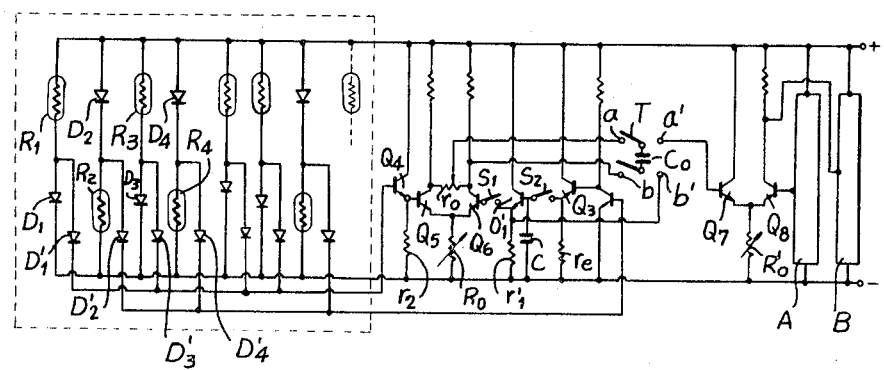
FIG. 2 is a wiring diagram of another embodiment of a system according to the invention.

The embodiment of the invention which is illustrated in FIG. 2 includes also a detector circuit means, enclosed by the area within the dotted lines shown at the left of FIG. 2. This detector circuit means of FIG. 2 is different from that of FIG. 1, but the remaining circuitry which forms the control circuit means is similar in many respects to that of FIG. 1, with the electrically-responsive means of FIG. 2 forming a shutter-control circuit structure rather than a meter which will only indicate a value. Thus, instead of an ammeter M as shown in FIG. 1, driven by the transistor $Q_7$, the system of FIG. 2 includes an additional transistor $Q_8$ forming a comparison circuit with the transistor $Q_7$, and the common emitter electrode of the comparison transistors $Q_7$ and $Q_8$ is electrically connected to a variable resistor $R'_o$, the circuit being such that the contact $a'$ of the switch means T is connected to the base of the transistor $Q_7$ while the base of the transistor $Q_8$ is provided with an output from a shutter-time restoration circuit A which is schematically represented, this circuit A being well known and acting to determine the exposure time used in connection with the operation of an electrical shutter-operating circuit B which is also schematically represented and which is of the type which responds to light which has already passed through the objective of the camera. Thus, the comparison circuit $Q_7$, $Q_8$ of the electrically responsive means of FIG. 2 will function to operate the shutter circuit B in such a way that the exposure time determined by the circuit A will be corrected according to the signal delivered to the transistor $Q_7$ from the switch contact $a'$ when the switch means T has been switched over to engage the contacts $a'$ and $b'$.

The entire circuit of FIG. 2 is adapted to be operated from a battery and switch in the same way as the circuit of FIG. 1 where the battery E and the switch S are illustrated. The detector circuit means of FIG. 2, within the area enclosed by the dotted lines, includes a first and a second series of series-connected photoconductors and diodes. The first series of series-connected photoconductors and diodes includes the photoconductors $R_1$, $R_3$, etc., respectively connected in series with the diodes $D_1$, $D_3$, etc., with all of these series-connected circuits being parallel and each having a junction between its photoconductor and diode. The second series of circuits which are also connected in parallel with each other, also each include a photoconductor and diode in series with each other, but in the second series of parallel circuits the photoconductors and diodes have a sequential arrangement with respect to each other which is the reverse of the sequential arrangement of the photoconductors and diodes of the first series. This second series is formed by the photoconductor $R_2$ and the diode $D_2$, the photoconductor $R_4$ and the diode $D_4$, etc., and it will be noted that while the diodes $D_2$ and $D_4$ are connected to the positive conductor from the battery, the diodes $D_1$ and $D_3$ are connected to the negative conductor from the battery, so that the reversal in the sequential arrangement of the series connected photoconductors and diodes of the first series of parallel connected circuits and the second series of parallel connected circuits is apparent from FIG. 2. The junctions between the photoconductors $R_1$, $R_3$, etc., and the diodes $D_1$, $D_3$, etc., of the first series are all respectively connected electrically with additional diodes $D'_1$, $D'_3$, etc., all of which are electrically connected with a common conductor electrically connected with the base of the transistor $Q_4$. The junctions between the photoconductors and diodes of the parallel-connected circuits of the second series are all respectively connected with additional diodes $D'_2$, $D'_4$, etc., which are all connected to a common conductor which is electrically connected with the base of the transistor $Q_2$. Thus, with this arrangement the photoconductors $R_1$, $R_3$, etc., will operate to detect relatively high luminosity regions while the photoconductors $R_2$, $R_4$, etc., will serve to detect low luminosity regions of the object which is to be photographed.

At the control circuit means of FIG. 2, the transistors $Q_5$ and $Q_6$ form also a comparison circuit in the same way as the comparison circuit of FIG. 1, with the variable resistor $R_o$ being connected to the common emitter and with the resistor $r_o$ being electrically connected between the collectors of the comparison transistors $Q_5$ and $Q_6$. Also, the transistor $Q_2$ is connected to the transistor $Q_3$ in the same way as the transistor $Q_2$ is connected to the transistor $Q_3$ with a load resistor $r_e$ being connected to the emitter of the transistor $Q_3$ also in the case of FIG. 2. However, between the transistor $Q_3$ and the transistor $Q'_1$ which corresponds to the transistor $Q_1$, there is a switch $S_2$ and a capacitor C is connected to the base of the transistor $Q'_1$ while a resistor $r'_1$ is connected to the emitter of the transistor $Q'_1$. This latter transistor is connected by a switch $S_1$ to the comparison transistor $Q_6$.

With the system of FIG. 2 the electrical shutter-control circuit B is driven at state of optimum exposure after the average signal from the control circuit means has been compared with the output signal of the exposure-time determining circuit A which responds to the light which has passed through the objective and which otherwise would be used for controlling the shutter-operating circuit B.

With the detector circuit means of FIG. 2, instead of directing a single photoconductor to different parts of the object, all of the photoconductors will respond to various regions of the object since they are directed to these various regions to receive light from the various regions of the object without any scanning operations being required. The detector circuit means operates in such a way that that one of the photoconductors $R_1$, $R_3$, etc., which receives a signal corresponding to maximum luminosity will operate while the remaining photoconductors of the latter series will remain inoperative, while that one of the photoconductors $R_2$, $R_4$, etc., which receives the lowest luminosity will operate while the remainder of the latter series will remain inoperative. Assuming, for example, that the photoconductor $R_1$ detects the maximum luminosity and the photoconductor $R_2$ detects the minimum luminosity, then the internal resistance of the photoconductor $R_1$ will have the lowest value of all of the resistors while the voltage drop across the diode $D_1$ will be at a maximum. As a result all of the diodes $D_3$, etc., of the corresponding parallel circuits which have their photoconductors and diodes connected in the same sequence will be non-conductive inasmuch as they are biased in reverse and are in a state of discontinuity, so that only the signal corresponding to the maximum luminosity will be transmitted through the diode $D'_1$ which is connected to the junction between the photoconductor $R_1$ and the diode $D_1$ to the base of the transistor $Q_4$.

On the other hand, where the photoconductor $R_2$ has detected the region of minimum luminosity, the internal resistance of the photoconductor $R_2$ has a maximum value so that the voltage drop occurs to the maximum extent, with all of the remaining diodes of this second series whose diodes and photoconductors are in the same sequence as the photoconductor $R_2$ and the diode $D_2$ being non-conductive or in a state of discontinuity, so that only through the diode $D'_2$ will a signal corresponding to the minimum luminosity be transmitted to the base of the transistor $Q_2$.

With an arrangement as shown in FIG. 2, the switches $S_1$ and $S_2$ will initially be closed, as by the first increment of movement of a shutter-operating plunger of a camera, so that the transistors $Q_2$, $Q_3$, and $Q'_1$ of FIG. 2 will operate in a manner similar to the corresponding transistors of FIG. 1.

Just before the shutter is released to make an exposure, the shutter-operating plunger will in a known way bring about movement of the switch means T away from the position engaging the contacts $a$ and $b$ into the position engaging the contacts $a'$ and $b'$, and simultaneously the switch $S_2$ is opened, so that the electrical shutter circuit B is driven in accordance with information provided by the average luminosity signal transmitted to the transistor $Q_7$, this average signal being compared with that of the exposure-time determining circuit A so as to correct the latter in order to achieve in a highly precise manner the optimum exposure time for the given photographing conditions.

Thus, with the embodiment of FIG. 2 it is possible to achieve signals according to the maximum and minimum luminosity in a fully automatic manner simply by directing the photoconductors of the detector circuit toward the object without any scanning operation being required.

Thus, with the above-described embodiments of the invention the systems will detect maximum and minimum luminosities and provide an average value calculated arithmetically therefrom to achieve optimum exposure based upon the average luminosity of an object which has regions of different luminosities. The charge at the capacitor $C_o$ corresponding to at least a fraction of the difference between the signals corresponding to maximum and minimum luminosity is arithmetically combined with either the maximum or the minimum luminosity signal for achieving the average signal which forms the input to the electrically-responsive means. Thus, in the case where the object to be photographed includes sky and land on a bright sunny day, the average luminosity value corresponding to the arithmetic average between the maximum and minimum luminosities will be automatically determined with a practical effectiveness which cannot be achieved by conventional average photometry or spot photometry, so that with the systems of the invention it is possible to achieve an optimum exposure with an extremely high precision, overcoming problems such as lack of uniformity in luminosity.

It will be noted that with the embodiment of FIG. 1 only a single photoconductor R is required. With this embodiment the photoconductor R need only be directed to the regions of the object which respectively have maximum and minimum luminosities to provide the average value which is an absolute value for accurately determining the best possible exposure. Also with the embodiment of FIG. 1 the meter M will directly indicate the average luminosity value which can be used for accurately determining the exposure so as to eliminate problems previously encountered with respect to lack of uniform luminosity. Of course, with the embodiment of FIG. 2 the shutter is directly controlled in accordance with the signal derived by the system of the invention. Thus, with the embodiments of the invention as described above a highly effective and accurate system is provided for dealing with the photographing of objects which have different regions with different luminosities.

What is claimed is:

1. In an electrical system to be used when an object having regions of different luminosities is to be photographed, photosensitive detector circuit means for detecting those regions of the object which have maximum and minimum luminosities, respectively, and for transmitting signals respectively corresponding to said maximum and minimum luminosities, respectively, electrically-responsive means for producing, in response to an electrical input, an operation to be used in connection with the photographing of an object, and control circuit means electrically connected between said detector circuit means and said electrically-responsive means for receiving said signals from said detector circuit means and for transmitting to said electrically-responsive means said input to which the latter responds for producing said operation, said control circuit means including a transistorized comparison circuit for comparing the signals of said detector circuit means which respectively correspond to maximum and minimum luminosity, said control circuit means also including a capacitor for receiving a charge corresponding at least to a fraction of the difference between said signals, and switch means also forming part of said control circuit means and having one position connecting said capacitor to the remainder of said control circuit means and another position connecting said capacitor to said electrically-responsive means for providing said input to which the latter responds, said control circuit means including a means connected with said switch means when the latter is in said other position thereof for transmitting through said switch means to said capacitor and through the latter to said electrically-responsive means a signal according to which one of said signals according to maximum and minimum luminosity is arithmetically combined with the charge received by said capacitor, said control circuit means further including a means operatively connected to said comparison circuit for providing at said capacitor a charge according to one-half the difference between said maximum and minimum luminosity signals when said switch means is in said one position thereof, whereby said switch means when in said other position thereof transmits to said electrically-responsive means a signal according to which the charge of said capacitor is arithmetically combined with one of said maximum and minimum luminosity signals so as to transmit to said electrically-responsive means an input corresponding to the average between the maximum and minimum luminosities at the object which is to be photographed.

2. The combination of claim 1 and wherein said electrically-responsive means includes at least one meter for indicating luminosity at the object.

3. The combination of claim 1 and wherein said electrically-responsive means is a shutter-control circuit for controlling the shutter of a camera.

4. The combination of claim 1 and wherein said means for transmitting one of said luminosity signals to said switch means when the latter is in said other position thereof transmits the signal corresponding to the minimum luminosity and adds the latter signal to the capacitor charge corresponding to one-half the difference between the maximum and minimum luminosities for providing said input corresponding to the average between the maximum and minimum luminosities.

5. The combination of claim 1 and wherein said detector circuit means includes a photoconductor and a first diode connected in series, a pair of additional diodes each connected electrically to a junction between said photoconductor and said first diode, and a pair of additional capacitors respectively connected in series with said pair of additional diodes and in parallel with said photoconductor and said first diode, respectively.

6. The combination of claim 5 and wherein said comparison circuit has a pair of transistors provided with emitters which are electrically connected to each other, said additional capacitors being respectively connected electrically with the bases of said transistors of said comparison circuit, and a pair of field effect transistors respectively connected in circuit portions between said additional capacitors and said bases of said transistors of said comparison circuit.

7. The combination of claim 1 and wherein said detector circuit means includes a first and a second series of parallel-connected circuits each including a series-connected photoconductor and diode and a junction therebetween, the photoconductor and diode of each of said first series of parallel-connected circuits being arranged with respect to each other in a sequence which is the reverse of the arrangement of the photoconductor and diode of each of said second series of parallel-connected circuits, a plurality of additional diodes respectively connected electrically with said junctions, and a pair of common conductors, one of which is electrically connected with and common to the diodes connected to the junctions of said first series and the other of which is common to and connected to the diodes which are connected to the junctions of said second series, so that said common conductors transmit, respectively, signals corresponding to maximum and minimum luminosity.

8. The combination of claim 7 and wherein said comparison circuit has a pair of transistors provided with interconnected emitters and with bases respectively connected electrically to said common conductors.

9. The combination of claim 1 and wherein said means for transmitting to said capacitor when said switch means is in said one position thereof a charge according to one-half the difference between the maximum and minimum luminosities includes a centrally-tapped resistor electrically connected with said comparison circuit and through said switch means with said capacitor when said switch means is in said one position thereof.

* * * * *